(12) United States Patent
Bengio et al.

(10) Patent No.: US 11,803,747 B2
(45) Date of Patent: *Oct. 31, 2023

(54) DEVICE PLACEMENT OPTIMIZATION WITH REINFORCEMENT LEARNING

(71) Applicant: Google LLC, Mountain View, CA (US)

(72) Inventors: Samuel Bengio, Los Altos, CA (US); Mohammad Norouzi, Richmond Hill (CA); Benoit Steiner, Mountain View, CA (US); Jeffrey Adgate Dean, Palo Alto, CA (US); Hieu Hy Pham, Menlo Park, CA (US); Azalia Mirhoseini, San Jose, CA (US); Quoc V. Le, Sunnyvale, CA (US); Naveen Kumar, San Jose, CA (US); Yuefeng Zhou, Sunnyvale, CA (US); Rasmus Munk Larsen, San Jose, CA (US)

(73) Assignee: Google LLC, Mountain View, CA (US)

(*) Notice: Subject to any disclaimer, the term of this patent is extended or adjusted under 35 U.S.C. 154(b) by 767 days.

This patent is subject to a terminal disclaimer.

(21) Appl. No.: 16/878,720

(22) Filed: May 20, 2020

(65) Prior Publication Data

US 2020/0279163 A1  Sep. 3, 2020

Related U.S. Application Data

(63) Continuation of application No. 16/445,330, filed on Jun. 19, 2019, now Pat. No. 10,692,003, which is a
(Continued)

(51) Int. Cl.
*G06N 3/08* (2023.01)
*G06N 5/04* (2023.01)
(Continued)

(52) U.S. Cl.
CPC ............... *G06N 3/08* (2013.01); *G06N 3/044* (2023.01); *G06N 3/045* (2023.01); *G06N 3/105* (2013.01); *G06N 5/04* (2013.01)

(58) Field of Classification Search
CPC .......... G06N 3/08; G06N 3/045; G06N 3/044
See application file for complete search history.

(56) References Cited

U.S. PATENT DOCUMENTS

| 2016/0098632 A1 | 4/2016 | Sutskever et al. |
| 2016/0140435 A1 | 5/2016 | Bengio et al. |

(Continued)

FOREIGN PATENT DOCUMENTS

| KR | 10-2006-0020114 | 3/2006 |
| KR | 10-2010-0067174 | 6/2010 |
| KR | 10-2012-0034378 | 4/2012 |

OTHER PUBLICATIONS

Hongzi Mao et al. 2016. Resource Management with Deep Reinforcement Learning. In Proceedings of the 15th ACM Workshop on Hot Topics in Networks (HotNets '16). Association for Computing Machinery, New York, NY, USA, 50-56. https://doi.org/10.1145/3005745.3005750 (Year: 2016).*

(Continued)

*Primary Examiner* — Ann J Lo
*Assistant Examiner* — Fen Christopher Tamulonis
(74) *Attorney, Agent, or Firm* — Fish & Richardson P.C.

(57) ABSTRACT

A method for determining a placement for machine learning model operations across multiple hardware devices is described. The method includes receiving data specifying a machine learning model to be placed for distributed processing on multiple hardware devices; generating, from the data, a sequence of operation embeddings, each operation embedding in the sequence characterizing respective operations necessary to perform the processing of the machine learning model; processing the sequence of operation
(Continued)

embeddings using a placement recurrent neural network in accordance with first values of a plurality network parameters of the placement recurrent neural network to generate a network output that defines a placement of the operations characterized by the operation embeddings in the sequence across the plurality of devices; and scheduling the machine learning model for processing by the multiple hardware devices by placing the operations on the multiple devices according to the placement defined by the network output.

20 Claims, 4 Drawing Sheets

Related U.S. Application Data continuation of application No. PCT/US2018/024155, filed on Mar. 23, 2018.

(60) Provisional application No. 62/476,618, filed on Mar. 24, 2017.

(51) Int. Cl.
*G06N 3/10* (2006.01)
*G06N 3/044* (2023.01)
*G06N 3/045* (2023.01)

(56) References Cited

U.S. PATENT DOCUMENTS

| 2016/0232440 | A1 | 8/2016 | Gregor et al. |
| 2017/0032243 | A1 | 2/2017 | Corrado et al. |
| 2017/0076196 | A1 | 3/2017 | Sainath et al. |
| 2017/0124451 | A1 | 5/2017 | Barham |

OTHER PUBLICATIONS

Ranzato, March'Aurelio et al. "Sequence Level Training with Recurrent Neural Networks" ICLR 2016 [Published 2016] [Retrieved Feb. 2023] <URL: https://doi.org/10.48550/arXiv.1511.06732> (Year: 2016).*
KR Office Action in Korean Application No. 10-2019-7026115, dated Aug. 24, 2020, 6 pages (with English translation).
Office Action in Chinese Appln. No. 201880011282.1, dated Dec. 5, 2022, 17 pages (with English Translation).
KR Office Action in Korean Application No. 10-2020-0092439, dated Aug. 21, 2020, 10 pages (with English translation).
Abadi et at, "Tensorflow: A system for large-scale machine learning," arXiv, May 31, 2016, 18 pages.
Abadi, M., et al., "TensorFlow: large scale machine learning on heterogeneous distributed systems," pub. in 2016 Retrieved from the Internet: URL: https:/iarxiv.on.:-/abs/1603.04467"\2 [retrieved on Jun. 25, 2018].
Arik et al, "Deep voice: real-time neural text-to-speech," arXiv, Mar. 7, 2017, 17 pages.
Bahdanau et al, "Neural machine translation by jointly learning to align and translate," arXiv, May 19, 2016, 15 pages.
Barnard et al, "A fast multilevel implementation of recursive spectral bisection for partitioning unstructured problems," Cray Research, Inc., Mar. 22, 1994, 20 pages.
Bello et al, "Neural combinatorial optimization with reinforement learning," arXiv, Jan. 12, 2017, 15 pages.
Bello, I., et al., "Neural combinatorial optimization with reinforcement learning," Jan. 12, 2017 Retrieved from the Internet: lilll. :hltJ):-.//nr:-;_iv_.orn:iabs/161_L09940v3 [retrieved on Jun. 25, 2018.
Chan et al, "Listen attend and spell," arXiv, Aug. 20, 2015, 16 pages.
Cho et al, "Learning phrase representations using mn encoder-decoder for statistical machine translation," arXiv, Sep. 3, 2014, 15 pages.
Coons, K. E., et al; "Feature selection and policy optimization for distributed instraction placement using reinforcement learning," Proceedings of the 17th International Conference on Parallel Architectures and Compilation Techniques (PACT'08), pp. 32-42; Oct. 25, 2008.
Fiduccia et al, "A linear-time heuristic for improving network partitions," IEEE Xplore, Jun. 1982, 4 pages.
Grave et at, "Toward end-to-end speech recognition with recurrent neural networks," Semantic Scholar, Jun. 2014, 9 pages.
Hagen et al, "New spectral methods for ratio cut partitioning and clustering," Semantic Scholar, Sep. 1992, 12 pages.
Hannun et al, "Deep speech: Scaling up end-to-end speech recognition," arXiv, Dec. 19, 2014, 12 pages.
He et al, "Deep residual learning for image recognition," arXiv, Dec. 10, 2015, 12 pages.
Hendrickson et al, "A multilevel algorithm for partitioning graphs," Sandia National Laboratories, Dec. 1995, 20 pages.
Hochreiter et al, "Long short term memory," ACM Digital Libraiy, Nov. 1997, 37 pages.
Huang, B. et al, "Resource elasticity for 1-17 large-scale machine learning," Proceedings of The 2015 ACM SIGMOD International Conference on Management of Data (SIGMOD'15), May 31, 2015 (May 31, 2015), pp. 137-152.
International Searching Authority; Notification of International Search Report and Written Opinion mailed in parent International application No. PCT/US2018/024155 (dated Aug. 21, 2018).
Johnson et al, "Optimization by simulated annealing: an experimental evaluation: part I, graph partitioning," John Hopkins University, Feb. 1988, 28pages.
Jozefowicz et al, "Exploring the limits of language modeling," arXiv, Feb. 11, 2016, 11 pages.
Karypis et al, "A fast and high quality multi-level scheme for partitioning irregular graphs," SIAM J. Sci. Comput., 1998, 34 pages.
Karypis et al, "Metis-unstructured graph partitioning and sparse matrix ordering system," University of Minnesota, Aug. 26, 1995, 16 pages.
Kemighan et al, "An efficient heuristic procedure for partitioning grpahs," IEEE Explore, Feb. 1970, 5 pages.
Khetan et al, "Achieving budget optimality with adaptive scheme in crowdsourcing," arXiv, Aug. 25, 2017, 32 pages.
Kingma et al, "Adam: A method for stochastic optimization," arXiv, Jan. 30, 2017, 15 pages.
Kirkpatrick et al, "Optimization by simulated annealing," Science, May 1983, 11 pages.
Krizhevsky et al, "Imagenet classification with deep convolutional neural networks," Papers NIPS, 2012, 9 pages.
Laich "Graph Partitioning and Scheduling for Distributed Dataflow Computation" University of Stuttgart [Published Mar. 16, 2017] [Retrieved Sep. 2019] <URL: https://elib.uni-stuttgart.de/handle/11682/9279>.
Mao et al, "Resource management with deep reinforcement learning," ACM, 2016, 7 pages.
Oord et al, "Wavenet: a generative model for raw audio," arXiv, Sep. 19, 2016, 15 pages.
Pascanu et al, "On the difficulty of training recurrent neural networks," arXiv, Feb. 16, 2013, 12 pages.
PCT International Preliminary Report on Patentability issued in International Application No. PCT/2018/024155, dated Oct. 3, 2019, 9 pages.
Pellegrini et al, "A parallelisable multi-level banded diffusion scheme for computing balanced partitions with smooth boundaries," ACM Digital Library, Aug. 2007, 10 pages.
Pellegrini et al, "Distillating knowledge about scotch," Dagstuhl Seminar Proceedings, 2009, 12 pages.
Pellegrini et al, "Experimental analysis of the dual recursive bipartitioning algorithm for static mapping," CiteSeerx, 1996, 39 pages.
Russakovsky et al, "ImageNet large scale visual recognition challenge," arXiv, Jan. 20, 2015, 43 pages.
Sutskever et al, "Sequence to sequence learning with neural networks," arXiv, Dec. 14, 2014, 9 pages.

(56) References Cited

OTHER PUBLICATIONS

Szegedy et al, "Going deeper with convolutions," arXiv, Sep. 17, 2014, 12 pages.
Szegedy et al, "Rethinking the inception architecture for computer visions," arXiv, Dec. 11, 2015, 11 pages.
Vinyals et al, "Pointer networks," arXiv, Jan. 2, 2017, 9 pages.
Wang et al, "Tacotron: a fully end-to-end text to speech synthesis model," arXiv, Apr. 6, 2017, 10 pages.
Williams et al, "Simple statistical gradient following algorithms for connectionnist reinforcement learning," CiteSeerx, May 1992, 27 pages.
Wu et al, "Google's neural machine translation system: Bridging the gap between human and machine translation," arXiv, Oct. 8, 2016, 23 pages.
Yu, D., et al, "The computational network toolkit," IEEE Signal Processing Magazine, vol. 32(6), pp. 123-126; Oct. 14, 2015.
Zaremba et al, "Recurrent neural network regularization," arXiv, Feb. 19, 2015, 8 pages.
Zhu, W., et al., "A Hopfield neural network based task mapping method," Computer Communications, vol. 22(11), pp. 1068-1079; Jul. 15, 1999.
Zhang et al, "Workload Prediction for Cloud Cluster using a Recurrent Neural Network," ICIIK '16, Oct. 2016, retrieved on Dec. 17, 2019, retrieved from URL <https://ieeexplore.ieee.org/abstract/document/8281183>, 104-109.
EP Office Action in European Application No. 18716863.8, dated Oct. 14, 2021, 10 pages.

\* cited by examiner

Process a current sequence of operation embeddings using a placement recurrent neural network to select one or more placements of the operations across the plurality of devices

302

For each selected placement: perform the processing of the machine learning model with the operations across the plurality of devices according to the placement, and determining a time required for the processing to complete

304

Adjust the current values of the network parameters using a reinforcement learning technique that uses a reward derived from the times required for the processing to complete for each of the selected placements

DEVICE PLACEMENT OPTIMIZATION WITH REINFORCEMENT LEARNING

CROSS-REFERENCE TO RELATED APPLICATION

This patent application is a continuation (and claims the benefit of priority under 35 USC 120) of U.S. patent application Ser. No. 16/445,330, filed Jun. 19, 2019, which claims the benefit of International Application No. PCT/US2018/024155, filed on Mar. 23, 2018, which claims priority to U.S. Provisional Application Ser. No. 62/476,618, filed on Mar. 24, 2017. The disclosure of these prior applications is considered part of and is incorporated by reference in the disclosure of this application.

BACKGROUND

This specification relates to determining a placement of machine learning model operations across multiple devices.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that determines a placement for machine learning model operations across multiple hardware devices.

The subject matter described in this specification can be implemented in particular embodiments so as to realize one or more of the following advantages. By using a recurrent neural network to determine a placement of machine learning model operations across multiple devices, the efficiency of performing the operations of the machine learning model using the devices is improved. In particular, placements can be generated that adapt to the hardware configuration available for the processing and that result in shorter running times for the processing of the model. By training the neural network using reinforcement learning with a reward derived from execution times, the recurrent neural network learns the properties of the current hardware environment including the complex tradeoff between computation and communication in hardware, allowing for the trained neural network to generate better-performing placements that more efficiently utilize the available resources. That is, the system can effectively adapt the placement to the current hardware environment to account for the computational capacity of the devices in the environment and to minimize delays caused by communication between devices and maximize the performance of the operations.

While this specification describes placing machine learning operations, the techniques described in this specification can be used to place any collection of operations that can be described by a computational graph across multiple hardware devices.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
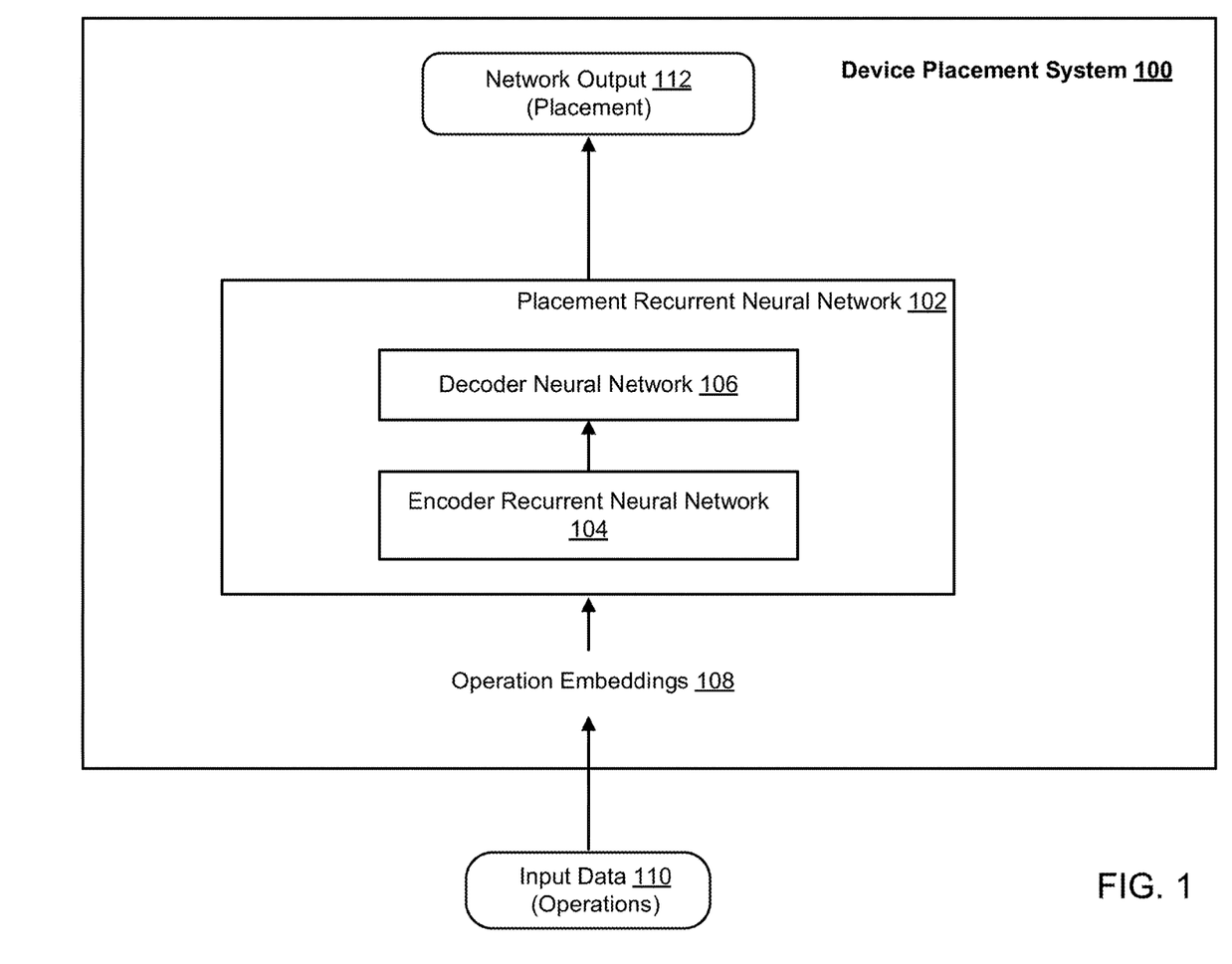
FIG. 1 shows an example device placement system that determines a placement for machine learning model operations.

FIG. 1 illustrates a device placement system 100 that determines a placement for operations of a machine learning model across multiple hardware devices. The device placement system 100 can be implemented as computer programs on one or more computers in one or more locations.

The machine learning model being placed can be configured to receive any kind of digital data input and to generate any kind of score, classification, or regression output based on the input.

For example, if the inputs to the machine learning model are images or features that have been extracted from images, the output generated by the machine learning model for a given image may be scores for each of a set of object categories, with each score representing an estimated likelihood that the image contains an image of an object belonging to the category.

As another example, if the inputs to the machine learning model are Internet resources (e.g., web pages), documents, or portions of documents or features extracted from Internet resources, documents, or portions of documents, the output generated by the machine learning model for a given Internet resource, document, or portion of a document may be a score for each of a set of topics, with each score representing an estimated likelihood that the Internet resource, document, or document portion is about the topic.

As another example, if the inputs to the machine learning model are features of a personalized recommendation for a user, e.g., features characterizing the context for the recommendation, e.g., features characterizing previous actions taken by the user, the output generated by the machine learning model may be a score for each of a set of content items, with each score representing an estimated likelihood that the user will respond favorably to being recommended the content item.

As another example, if the input to the machine learning model is a sequence of text in one language, the output generated by the machine learning model may be a score for each of a set of pieces of text in another language, with each score representing an estimated likelihood that the piece of text in the other language is a proper translation of the input text into the other language.

As another example, if the input to the machine learning model is a sequence representing a spoken utterance, the output generated by the machine learning model may be a score for each of a set of pieces of text, each score representing an estimated likelihood that the piece of text is the correct transcript for the utterance.

In particular, the device placement system 100 receives input data 110 that specifies a machine learning model to be placed for distributed processing on a plurality of hardware devices. The hardware devices are generally heterogeneous, and can include any appropriate hardware device, e.g., a combination of any of, CPUs, GPUs, ASICs or other special-purpose hardware, FPGAs, and so on.

The input data 110 specifying the machine learning model may include data that represents a computational graph. The computational graph has vertices that represent operations and edges that represent data communicated between the operations.

For example, the input data 110 includes data that represents a computational graph G having vertices that represent M operations $\{o_1, o_2, \ldots o_M\}$. The M operations can be operations to train the machine learning model or operations to generate outputs from received inputs using the machine learning model once the machine learning model has already been trained. Given M operations, the device placement system 100 aims to determine a placement=$\{p_1, p_2, \ldots, p_M\}$. The placement P is an assignment of each operation $o_i \in G$ to a device $p_i$ that belongs to a set of D available hardware devices, i.e., $p_i \in \{1, \ldots, D\}$.

An example computational graph and an example placement of computational graph operations of the graph on multiple hardware devices are described in detail with reference to FIG. 4.

To determine a placement, the system 100 trains a placement recurrent neural network 102 that generates outputs that define placements of the operations across the devices. Once the placement recurrent neural network 102 has been trained, the system 100 can generate a final placement. As an example, the system 100 may run the trained placement recurrent neural network 102 and use the output of the trained placement recurrent neural network 102 to determine the final placement. In another example, the system 100 may use the best placement seen during the training as the final placement.

The system 100 can then schedule the machine learning model for processing by the plurality of hardware devices, i.e., causing the operations of the machine learning model to be executed according to the final placement. In some other cases, the system 100 can provide data identifying the final placement to another system that manages the execution of the machine learning model so that the other system can place the operations across the devices according to the final placement.

As part of training the placement recurrent neural network, the system 100 generates, from the input data 110, a sequence of operation embeddings 108. Each operation embedding in the sequence 108 characterizes one or more respective operations necessary to perform the processing of the machine learning model. An embedding is an ordered collection of numeric values, e.g., a vector or a matrix of floating point values or of quantized floating point values.

In some cases, the system combines multiple different embeddings to generate a single operation embedding for each operation in the sequence.

More specifically, to generate an operation embedding characterizing a particular operation, the system 100 generates a type embedding of an operation type of the particular operation. For example, an operation type may describe an underlying computation (e.g., matrix multiplication or two-dimensional convolution or one-dimensional convolution or non-linear activation function) of the operation, and the type embedding may be a tunable embedding vector of the operation type, i.e., so that each operation of the same type shares the same type embedding.

The system 100 generates an output size embedding that characterizes a size of outputs generated by the particular operation. For instance, the system 100 may record the size of each of the outputs (e.g., output tensors) generated by the particular operation and concatenate the recorded sizes to generate into an output shape (e.g., a fixed-size zero-padded list). The output shape is the output size embedding of the particular operation.

The system 100 generates an adjacency embedding (e.g., a one-hot encoding vector) that identifies operations that provide input to and receive output generated by the particular operation.

The system 100 generates the operations embedding characterizing the particular operations from a combination of embeddings. The combination of embeddings used by the system 100 can vary. For example, in some cases, the system 100 may combine three kinds of embeddings described above, e.g., the type embedding, the output size embedding, and the adjacency embedding, to generate the operation embedding characterizing the particular operation. For example, the system 100 may concatenate the type embedding, the output size embedding, and the adjacency embedding to generate the operation embedding. In some other cases, the system 100 may combine two of the three kinds of embeddings described above to generate the operation embedding. In some other cases, the system 100 may combine one or more of the three kinds of embeddings described above with a new kind of embedding to generate the operation embedding.

In some implementations, as part of generating the sequence of operation embeddings, the system 100 determines that two or more of the operations represented by vertices in the computational graph are to be co-located on the same device, and in response, the system 100 generates a single operation embedding that characterizes the two or more operations.

During each iteration of the training of the placement recurrent neural network 102, the system 100 processes the sequence of operation embeddings 108 using the placement recurrent neural network 102 in accordance with current values of network parameters of the placement recurrent neural network 102. The placement recurrent neural network 102 is configured to process the sequence of operation embeddings 108 in accordance with the current values to generate a network output 112. The network output 112 defines a placement of the operations characterized by the operation embeddings in the sequence across the plurality of devices.

In particular, the placement recurrent neural network 102 is configured to generate, for each of the operation embeddings in the sequence 108, a set of scores that includes a respective score for each hardware device in the set of available hardware devices. A respective score for each hardware device is a likelihood that represents how likely it is that the hardware device is the best device to assign the operation characterized by the operation embedding. The neural network 102 is then configured to select a device for each of the operations using the set of scores for the operation embedding. In some cases, the neural network 102 may select the device that has the highest score according to the set of scores for the operation embedding. In some other cases, the neural network 102 may sample a device from the plurality of devices according to probabilities defined by the set of scores for the operation embedding characterizing the operation.

Once a device is selected for each of the operations, the neural network 102 outputs the network output 112 that defines a placement of the operations across the plurality of hardware devices.

The system 100 may schedule the machine learning model for processing by the plurality of hardware devices by placing the operations on the plurality of devices according to the placement defined by the network output 112.

Generally, the placement recurrent neural network 102 can be a recurrent neural network that includes a sequence-to-sequence model with Long Short-Term Memory (LSTM) neural network layers and a content-based attention mechanism. An example sequence-to-sequence model is described in Sutskever et al. "Sequence to sequence learning with neural networks" in Neural Information Processing Systems, 2014. An example content-based attention mechanism is described in Bandanau, Dzmitry et al. "Neural machine translation by jointly learning to align and translate." In International Conference on Learning Representations, 2015.

The architecture of the placement recurrent neural network 102 can be divided into two parts: an encoder recurrent neural network 104 and a decoder neural network 106.

The encoder recurrent neural network 104 is configured to receive as input a sequence of operation embeddings. The encoder recurrent neural network 104 processes the sequence of operation embeddings to generate a respective encoder hidden state for each of the operation embeddings.

For each of the operation embeddings, the decoder neural network 106 is configured to receive a decoder input and to process the decoder input and the encoder hidden states to generate a set of scores for the operation embedding. The decoder input for each of the operation embeddings after a first operation embedding in the sequence identifies a device selected for the one or more operations represented by the preceding operation embedding in the sequence. For the first operation embedding, the decoder neural network 106 may process only the encoder hidden states to generate the set of scores for the first operation embedding.

An example architecture of the placement recurrent neural network 102 is described in more detail below with reference to FIG. 2.

The system 100 can update values of the network parameters of the placement recurrent neural network 102 based on running time using the process described in detail below with reference to FIG. 3.

Figure 2:
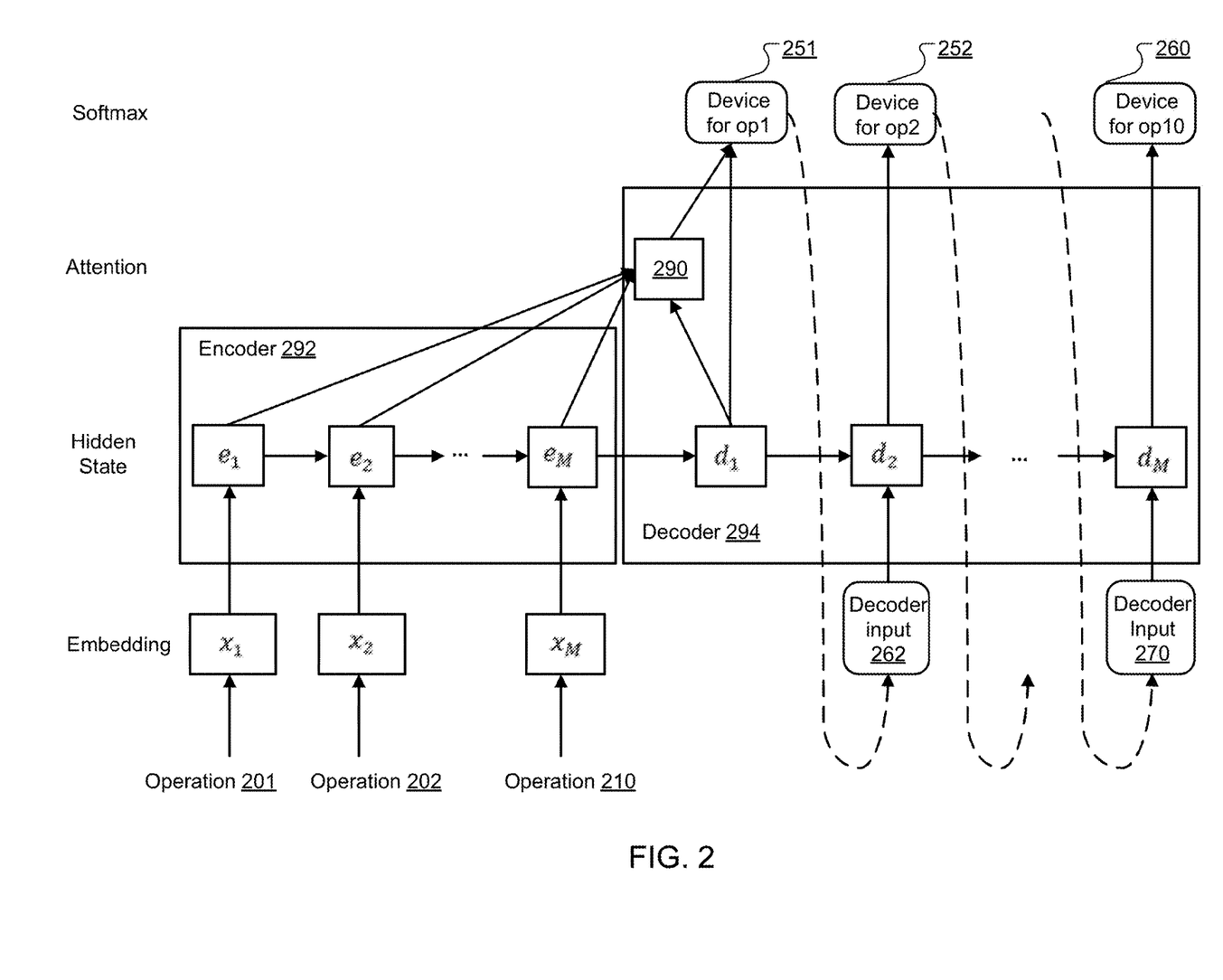
FIG. 2 shows an example architecture of a placement recurrent neural network.

FIG. 2 shows an example architecture of a placement recurrent neural network. The placement recurrent neural network includes an encoder 292 and a decoder 294.

The encoder recurrent neural network 292 is configured to receive as input a sequence of operation embeddings (e.g., embeddings 211, 212 . . . , 220). The sequence of operation embeddings characterize operations that are necessary to perform the processing of a machine learning model on a plurality of hardware devices. The encoder recurrent neural network 292 processes the sequence of operation embeddings to generate a respective encoder hidden state for each of the operation embeddings. For example, as shown in FIG. 2, the encoder recurrent neural network 292 generates a list of encoder hidden states $e_1, e_2, \ldots e_M$ for operation embeddings $x_1, x_2, \ldots, x_M$, where M is the number of operations that are necessary to perform the processing of the machine learning model.

The decoder neural network 294 maintains LSTM hidden states $d_1, d_2, \ldots, d_M$ and is configured to output a device for a respective operation embedding at each decoding time step. Each decoding time step corresponds to one operation embedding.

In particular, for each of the operation embeddings, the decoder neural network 294 is configured to receive a decoder input and to process the decoder input and a set of appropriate encoder hidden states to generate a set of scores for the operation embedding. The decoder neural network 294 may generate the set of scores for the operation embedding using a softmax neural network layer. The set of scores for the operation embedding includes a respective score for each hardware device in the plurality of hardware devices. A respective score for each hardware device is a likelihood that represents how likely it is that the hardware device is the best device to assign the operation characterized by the operation embedding. The decoder neural network 294 is then configured to select a device for each of the operations using the set of scores for the operation embedding. In some cases, the decoder 294 may select the device that has the highest score according to the set of scores for the operation embedding. In some other cases, the decoder 294 may sample a device from the plurality of devices according to probabilities defined by the set of scores for the operation embedding characterizing the operation.

The decoder neural network 294 can use an attention mechanism to determine a set of appropriate encoder hidden states to be used at each decoding time step. The decoder input for each of the operation embeddings after the first operation embedding in the sequence identifies a device selected for the one or more operations represented by the preceding operation embedding in the sequence. For example, the decoder input 262 for the second operating embedding in the sequence is a device embedding that identifies the device 251 that is selected for the first operating embedding. For the first operation embedding, the decoder neural network 106 may process only the appropriate encoder hidden states to generate the set of scores for the first operation embedding.

Figure 3:
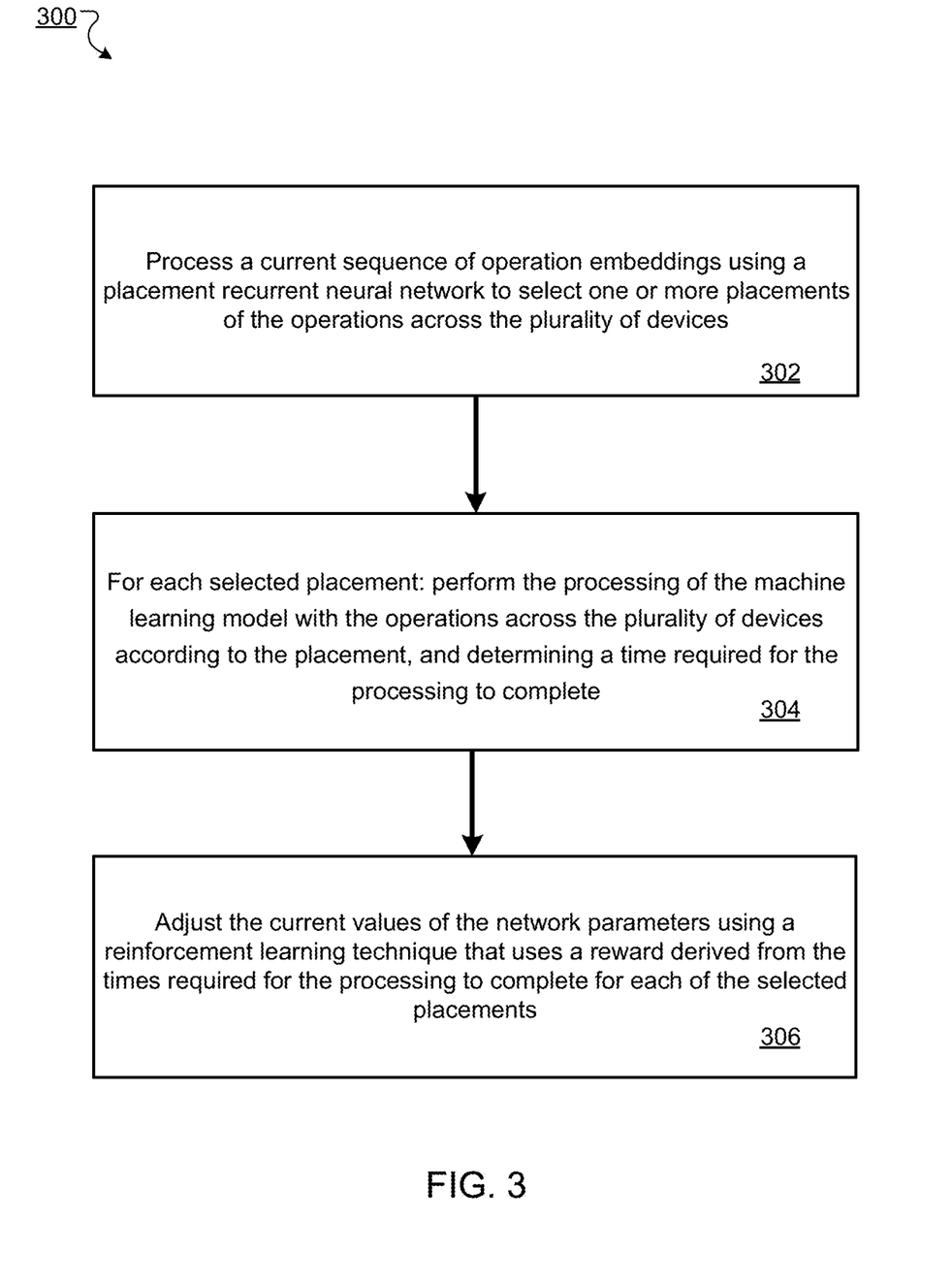
FIG. 3 is a flow diagram of an example process for updating values of network parameters of a placement recurrent neural network during training.

FIG. 3 is a flow diagram of an example process 300 for training a placement recurrent neural network (e.g., the placement recurrent neural network 102 of FIG. 1) to update values of network parameters of the placement recurrent neural network. For convenience, the process 300 will be described as being performed by a system of one or more computers located in one or more locations. For example, a device placement system, e.g., the device placement system 100 of FIG. 1, appropriately programmed in accordance with this specification, can perform the process 300.

Generally, given a computational graph G having vertices that represent M operations $\{o_1, o_2, \ldots o_M\}$ that are necessary to perform the processing (or training) of a machine learning model on a plurality of hardware devices, it is desirable for the trained placement recurrent neural network to determine a placement that requires a minimal time to perform the processing of the machine learning model under the placement. A placement $P=\{p_1, p_2, \ldots, p_M\}$ is an assignment of an operation $o_i \in G$ to a device $p_i$ that belongs to a set of D hardware devices, i.e., $p_i \in \{1, \ldots, D\}$. Let r(P) denote the time that it takes to perform a complete execution of M operations in the computational graph G under the placement P (hereafter referred to as running time). The system trains the placement recurrent neural network to find P such that the execution time r(P) is minimized.

To update values of the network parameters of the placement recurrent neural network (e.g., from initial values or current values of the network parameters), the system repeatedly performs steps 302-306 as follows.

The system processes a current sequence of operation embeddings using the placement recurrent neural network in accordance with current values of network parameters of the placement recurrent neural network to select one or more placements (e.g., K placements) of the operations across the plurality of devices (step 302).

For example, to select K placements, the system can run the placement recurrent neural network K times to draw K placements from a probability distribution of placements defined by the placement recurrent neural network. That is, the system provides a batch of K identical input examples to the placement recurrent neural network. Each input example in the batch is the same current sequence of operation embeddings. For each input examples in the batch, the placement recurrent neural network is configured to process the current sequence of operation embeddings through an encoder recurrent neural network and a decoder neural network to generate a placement in accordance with a probability distribution of placement defined by the placement recurrent neural network (i.e., defined by a softmax neural network layer of the placement recurrent neural network) in the manner as described in detail above with reference to FIG. 1.

The system performs step 304 for each selected placement. In particular, the system performs the processing of the machine learning model with the operations across the plurality of devices according to the placement, and then determines a time required for the processing to complete. That is, for each selected placement, the system can monitor the processing of the machine learning model with the operations placed according to the selected placement and identify the time required for the processing to complete.

The system adjusts the current values of the parameters using a reinforcement learning technique that uses a reward derived from the times required for the processing to complete for each of the selected placements (step 306). Generally, the reward is higher when the running time is shorter to encourage the placement neural network to generate placements that have shorter running times.

In particular, the system trains the placement recurrent neural network to maximize the reward by minimizing the following objective function that defines a negative of the reward:

$$J(\theta) = E_{\mathcal{P} \sim \pi(\mathcal{P}|\mathcal{G};\theta)}[R(\mathcal{P})|\mathcal{G}],$$

where $\theta$ denotes the network parameters of the placement recurrent neural network, $\pi(\mathcal{P}|\mathcal{G};\theta)$ denotes a probability distribution of placements defined by the placement recurrent neural network, $R(\mathcal{P})$ is the square root of the running time r(P). The objective function computes an expected value of the square roots of K running times for the K placements selected by the system (e.g., by running the placement recurrent neural network K times to draw K placements from the probability distribution of placements $\pi(\mathcal{P}|\mathcal{G};\theta)$ given the computational graph $\mathcal{G}$.

The system determines a gradient of the objective function using a reinforcement learning technique, e.g., a REINFORCE technique. Using a REINFORCE technique, the gradient of the objective function can be expressed as follows:

$$\nabla_\theta J(\theta) = E_{\mathcal{P} \sim \pi(\mathcal{P}|\mathcal{G};\theta)}[R(\mathcal{P}) \cdot \nabla_\theta \log p(\mathcal{P}|\mathcal{G};\theta)]$$

where p is the probability assigned to the placement by the placement recurrent neural network, i.e., the product of the scores generated by the placement recurrent neural network for the individual placements.

To reduce the variance of the gradient, the system can use a baseline term B, which is a moving average of the K running times, to approximate the gradient as follows:

$$\nabla_\theta J(\theta) \approx \frac{1}{K} \sum_{i=1}^{K} (R(\mathcal{P}_i) - B) \cdot \nabla_\theta \log p(\mathcal{P}_i|\mathcal{G};\theta)$$

The system can backpropagate the gradient of the objective function to determine a respective updated value for each of the network parameters of the placement recurrent neural network.

While adjusting the current values of the network parameters, the system can optionally adjust the operation embeddings in the current sequence as part of the reinforcement learning technique, i.e., by backpropagating gradients into the operation embeddings.

Figure 4:
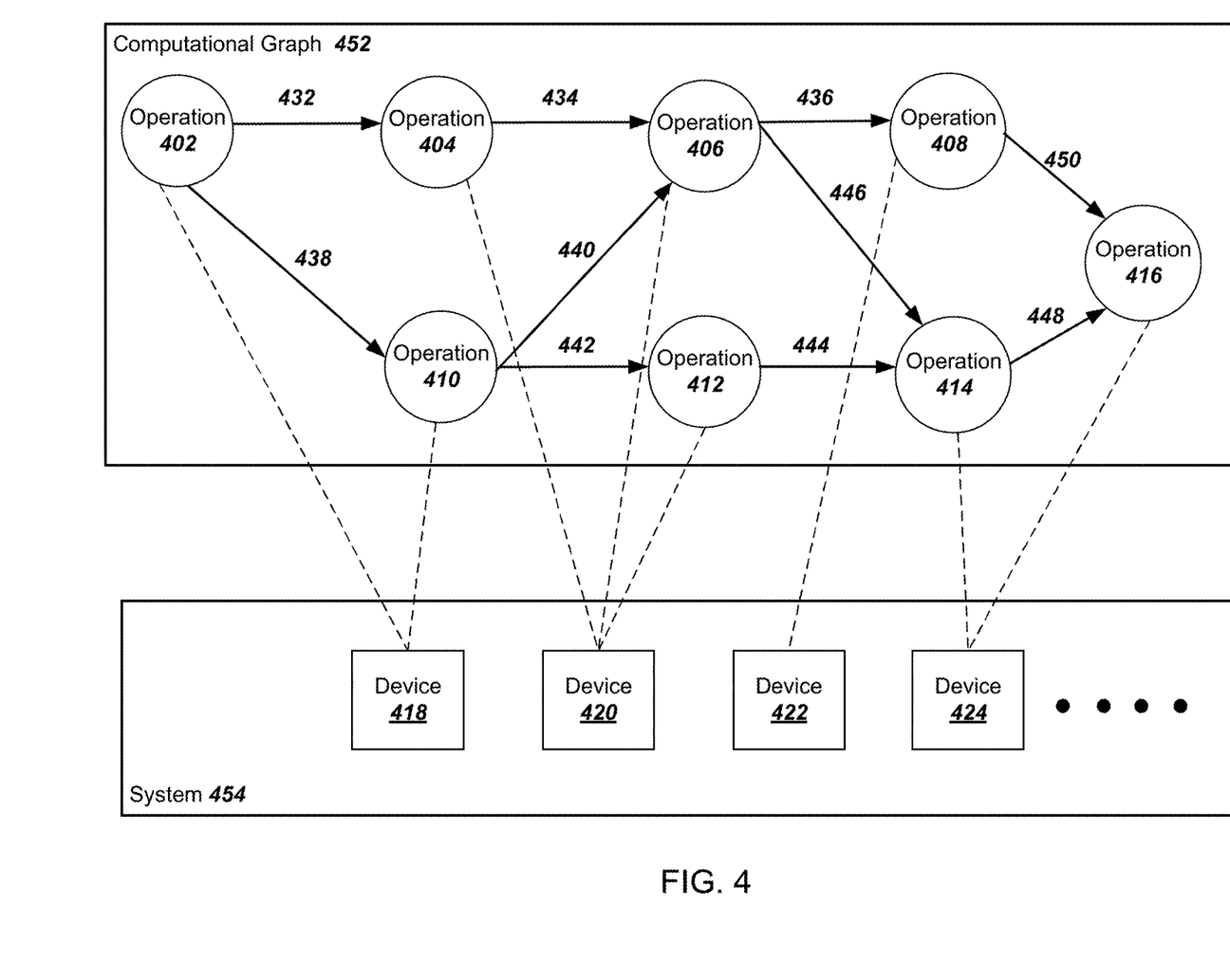
FIG. 4 illustrates an example computational graph and an example placement of computational graph operations of the graph on multiple devices.

FIG. 4 illustrates an example computational graph 452 and an example placement of computational graph operations of the graph 452 on multiple devices of a system 454. The computational graph 450 includes vertices that represent operations 402-416. The computational graph 450 further includes edges 432-450 that represent data communicated between the operations 402-406. For example, the computational graph 450 can be a TensorFlow computational graph whose vertices represent operations and edges represent multidimensional data arrays (tensors) communicated between the operations.

Each of the operations 402-416 can be assigned to one of the devices 418-424 of the system 454 according to a particular placement, e.g., a placement determined by a device placement system (e.g., the device placement system 100 of FIG. 1) using a placement recurrent neural network (e.g., the placement recurrent neural network 102 of FIG. 1). FIG. 4 shows an example placement in which operation 402 and 410 are assigned to device 418, operations 404, 406, and 412 are assigned to device 420, operation 408 is assigned to device 422, and operations 414 and 416 are assigned to device 424.

The devices 418-424 are generally heterogeneous, and can include any appropriate hardware devices, e.g., a combination of any of, CPUs, GPUs, ASICs or other special-purpose hardware, FPGAs, and so on. For example, in some implementations, the system 454 can be a single machine with one or more CPUs and one or more GPUs and each of the operations 402-416 can be assigned to one of the CPUs and GPUs according to the particular placement. In some other implementations, the system 454 can include multiple machines with a mix of GPUs and ASICs or FPGAs and each of the operations 402-416 can be assigned to a device of one of the machines according to the particular placement.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for training a placement neural network, the placement neural network configured to process a sequence of operation embeddings with each operation embedding in the sequence characterizing one or more respective operations that are part of performing the processing of a machine learning model to generate a network output defining a placement of the operations characterized by the operation embeddings in the sequence across a plurality of devices, the method comprising:
 processing a training sequence of operation embeddings using the placement neural network in accordance with current values of network parameters of the placement neural network to select K placements of the operations across the plurality of devices;
 for each of the selected K placements:
  performing the processing of the machine learning model with the operations across the plurality of devices according to the placement, and
  determining a running time required for the processing to complete; and
 adjusting the current values of the network parameters using a reinforcement learning technique that uses a reward derived from the running times required for the processing to complete for each of the selected K placements.

2. The method of claim 1, wherein processing the training sequence of operation embeddings to select the K placements comprises:
 running the placement neural network K times to draw the K placements from a probability distribution of placements defined by the placement neural network.

3. The method of claim 2, wherein running the placement neural network K times to draw the K placements comprises:
 providing a batch of K identical input examples to the placement neural network, wherein each input example in the batch is the same training sequence of operation embedding, and
 for each input example in the batch, processing the training sequence of operation embeddings through an encoder recurrent neural network and a decoder neural network of the placement neural network to generate a respective placement in accordance with a probability distribution of placements defined by the placement neural network.

4. The method of claim 1, wherein the reinforcement learning technique is a REINFORCE technique.

5. The method of claim 1, wherein adjusting the current values of the network parameters using a reinforcement learning technique that uses a reward derived from the times required for the processing to complete for each of the selected K placements comprises:
 adjusting the current values of the network parameters to optimize an objective function.

6. The method of claim 5, wherein the objective function defines a negative of the reward and computes an expected value of square roots of K running times for the selected K placements.

7. The method of claim 5, wherein the reinforcement learning technique comprises: using a baseline that is a moving average of the K running times to approximate a gradient of the objective function, and backpropagating the gradient of the objective function to determine adjusted values for the network parameters that minimize the objective function.

8. The method of claim 1, wherein adjusting the current values of the network parameters further comprises: adjusting the operation embeddings in the training sequence as part of the reinforcement learning technique.

9. One or more non-transitory computer storage media storing instructions that, when executed by one or more computers, cause the one or more computers to perform operations for training a placement neural network, the placement neural network configured to process a sequence of operation embeddings with each operation embedding in the sequence characterizing one or more respective operations that are part of performing the processing of a machine learning model to generate a network output defining a placement of the operations characterized by the operation embeddings in the sequence across a plurality of devices, the operations comprising:

processing a training sequence of operation embeddings using the placement neural network in accordance with current values of network parameters of the placement neural network to select K placements of the operations across the plurality of devices;

for each of the selected K placements:
performing the processing of the machine learning model with the operations across the plurality of devices according to the placement, and
determining a running time required for the processing to complete; and adjusting the current values of the network parameters using a reinforcement learning technique that uses a reward derived from the running times required for the processing to complete for each of the selected K placements.

10. The one or more non-transitory computer storage media of claim 9, wherein the operations for processing the training sequence of operation embeddings to select the K placements comprise:

running the placement neural network K times to draw the K placements from a probability distribution of placements defined by the placement neural network.

11. The one or more non-transitory computer storage media of claim 10, wherein the operations for running the placement neural network K times to draw the one or more K placements comprises:

providing a batch of K identical input examples to the placement recurrent neural network, wherein each input example in the batch is the same training sequence of operation embedding, and for each input example in the batch, processing the training sequence of operation embeddings through an encoder recurrent neural network and a decoder neural network of the placement neural network to generate a respective placement in accordance with a probability distribution of placements defined by the placement neural network.

12. The one or more non-transitory computer storage media of claim 9, wherein the reinforcement learning technique is a REINFORCE technique.

13. The one or more non-transitory computer storage media of claim 9, wherein adjusting the current values of the network parameters using a reinforcement learning technique that uses a reward derived from the times required for the processing to complete for each of the selected K placements comprises:

adjusting the current values of the network parameters to optimize an objective function.

14. The one or more non-transitory computer storage media of claim 13, wherein the objective function computes an expected value of square roots of K running times for the selected K placements.

15. The one or more non-transitory computer storage media of claim 13, wherein the reinforcement learning technique comprises: using a baseline that is a moving average of the running times to approximate a gradient of the objective function, and backpropagating the gradient of the objective function to determine adjusted values for the network parameters that minimize the objective function.

16. The one or more non-transitory computer storage media of claim 9, wherein adjusting the current values of the network parameters further comprises:

adjusting the operation embeddings in the training sequence as part of the reinforcement learning technique.

17. A system comprising:
one or more computers; and
one or more non-transitory computer storage media storing instructions that, when executed by the one or more computers, cause the one or more computers to perform operations for training a placement neural network, the placement neural network configured to process a sequence of operation embeddings with each operation embedding in the sequence characterizing one or more respective operations that are part of performing the processing of a machine learning model to generate a network output defining a placement of the operations characterized by the operation embeddings in the sequence across a plurality of devices, the operations comprising:

processing a training sequence of operation embeddings using the placement neural network in accordance with current values of network parameters of the placement neural network to select K placements of the operations across the plurality of devices;

for each of the selected K placements:
performing the processing of the machine learning model with the operations across the plurality of devices according to the placement, and
determining a running time required for the processing to complete; and adjusting the current values of the network parameters using a reinforcement learning technique that uses a reward derived from the running times required for the processing to complete for each of the selected K placements.

18. The system of claim 17, wherein the operations for processing the training sequence of operation embeddings to select the K placements comprise:

running the placement neural network K times to draw the K placements from a probability distribution of placements defined by the placement neural network.

19. The system of claim 18, wherein the operations for running the placement neural network K times to draw the one or more K placements comprises:

providing a batch of K identical input examples to the placement recurrent neural network, wherein each input example in the batch is the same training sequence of operation embedding, and for each input example in the batch, processing the training sequence of operation embeddings through an encoder recurrent neural network and a decoder neural network of the placement neural network to generate a respective placement in accordance with a probability distribution of placements defined by the placement neural network.

20. The system of claim 17, wherein adjusting the current values of the network parameters using a reinforcement learning technique that uses a reward derived from the times required for the processing to complete for each of the selected K placements comprises:

adjusting the current values of the network parameters to optimize an objective function.

\* \* \* \* \*